(12) United States Patent
Iijima

(10) Patent No.: US 10,108,152 B2
(45) Date of Patent: Oct. 23, 2018

(54) SERVO CONTROL DEVICE HAVING FUNCTION OF AUTOMATICALLY ADJUSTING CONTROL SYSTEM WITH AUTONOMOUS STABILIZATION

(71) Applicant: FANUC CORPORATION, Yamanashi (JP)

(72) Inventor: Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/466,975

(22) Filed: Mar. 23, 2017

(65) Prior Publication Data

US 2017/0300017 A1 Oct. 19, 2017

(30) Foreign Application Priority Data

Apr. 13, 2016 (JP) .................. 2016-080380

(51) Int. Cl.
*G05B 1/00* (2006.01)
*G05B 5/01* (2006.01)

(52) U.S. Cl.
CPC ...... *G05B 5/01* (2013.01); *G05B 2219/41025* (2013.01)

(58) Field of Classification Search
CPC ........... G05B 2219/41025; G05B 2219/41121; G05B 2219/41166; G05B 2219/41229; G05B 23/0256; G05B 2219/41093
See application file for complete search history.

(56) References Cited

U.S. PATENT DOCUMENTS

| 5,339,206 A | * | 8/1994 | Takahashi | ............ | G11B 5/5547 |
| | | | | | 360/75 |
| 8,198,851 B2 | * | 6/2012 | Komiya | .................. | H02P 29/50 |
| | | | | | 180/446 |

(Continued)

FOREIGN PATENT DOCUMENTS

| JP | 2009165258 A | 7/2009 |
| JP | 2012233885 A | 11/2012 |
| WO | 2009019953 A1 | 2/2009 |

OTHER PUBLICATIONS

English Abstract and Machine Translation for WO Publication No. 20091019953 A1, published Feb. 12, 2009, 39 pgs.

(Continued)

*Primary Examiner* — Bickey Dhakal
(74) *Attorney, Agent, or Firm* — Fredrikson & Byron, P.A.

(57) ABSTRACT

A servo control device according to the present invention includes a speed command generation unit, a torque command generation unit, a speed detection unit, a speed control loop, a speed control gain setting unit for setting a speed control gain for the speed control loop, a sinusoidal disturbance input unit for performing a sinusoidal sweep on the speed control loop, a frequency characteristic calculation unit, and a gain adjustment unit. When the speed control loop has fallen into an oscillation state and has become unstable owing to the increased speed control gain, the speed control gain is reduced and the sinusoidal sweep is temporarily stopped. After the speed control loop is stabilized using the speed control gain which is lower than in the unstable state, the sinusoidal sweep is restarted.

2 Claims, 3 Drawing Sheets

(56) References Cited

U.S. PATENT DOCUMENTS

| | | | |
|---|---|---|---|
| 9,703,273 B2* | 7/2017 | Iijima | G05B 13/0265 |
| 2016/0123796 A1* | 5/2016 | Nagaoka | G05B 19/4062 |
| | | | 702/56 |

OTHER PUBLICATIONS

English Abstract and Machine Translation for Japanese Publication No. 2009-165258 A, published Jul. 23, 2009, 18 pgs.
English Abstract and Machine Translation for Japanese Publication No. 2012-233885 A, published Nov. 29, 2012, 11-29, 15 pgs.

* cited by examiner

SERVO CONTROL DEVICE HAVING FUNCTION OF AUTOMATICALLY ADJUSTING CONTROL SYSTEM WITH AUTONOMOUS STABILIZATION

This application is a new U.S. patent application that claims benefit of JP 2016-080380 filed on Apr. 13, 2016, the content of 2016-080380 is incorporated herein by reference.

BACKGROUND OF THE INVENTION

1. Field of the Invention

The present invention relates to a servo control device, and specifically relates to a servo control device having the function of automatically adjusting a control system with autonomous stabilization.

2. Description of Related Art

Many devices and methods related to measurement of frequency characteristics of control systems of servo control devices have been proposed, and are widely used in measuring transmission characteristics of feed axes of machine tools. Methods for automatically adjusting control gains are also known.

A method for controlling a gain in which a sinusoidal sweep wave is applied to a control system of a servo control device as a disturbance is known (for example, Re-publication of PCT International Publication No. WO 2009/19953, hereinafter referred to as "patent document 1"). FIG. 1 shows a block diagram of a conventional motor control device. In FIG. 1, a motor control device 1000 includes a motor 1001, a detection unit 1002, a control unit 1003, a machine 1004, a disturbance signal generation unit 1005, a compensation drive force detection unit 1006, an oscillation calculation unit 1007, an oscillation detection unit 1008, an oscillation storage unit 1009, and an open loop simulation gain calculation unit 1010. Patent document 1 discloses that the disturbance signal generation unit 1005 adds a sinusoidal sweep wave as a disturbance signal to a drive force outputted from the control unit 1003.

However, the conventional technology has a problem that when the motor control device has become an unstable state in online automatic adjustment of the control system, the motor control device cannot recover automatically.

SUMMARY OF THE INVENTION

An object of the present invention is to provide a servo control device that, when a control system has become unstable, can perform an adjustment sequence for online automatic adjustment of the control system until completion, while automatically stabilizing the control system.

A servo control device according to an embodiment of the present invention is a servo control device for a machine tool having a feed axis driven by a servomotor. The servo control device includes a speed command generation unit for generating a speed command value for the servomotor; a torque command generation unit for generating a torque command value for the servomotor; a speed detection unit for detecting the speed of the servomotor; a speed control loop including the speed command generation unit, the torque command generation unit, and the speed detection unit; a speed control gain setting unit for setting a speed control gain being a control gain for the speed control loop; a sinusoidal disturbance input unit for performing a sinusoidal sweep on the speed control loop; a frequency characteristic calculation unit for estimating the gains and phases of speed control loop input and output signals from the outputs of the speed control loop when a sinusoidal wave is inputted to the speed control loop; and a gain adjustment unit for adjusting the speed control gain online. When the speed control loop has fallen into an oscillation state and has become unstable owing to the increased speed control gain, the speed control gain is reduced and the sinusoidal sweep is temporarily stopped, and after the speed control loop is stabilized using the speed control gain which is lower than in the unstable state, the sinusoidal sweep is restarted.

BRIEF DESCRIPTION OF THE DRAWINGS

The objects, features, and advantages of the present invention will be more apparent from the following description of an embodiment in conjunction with the attached drawings, wherein.

DETAILED DESCRIPTION OF THE INVENTION

Figure 1:
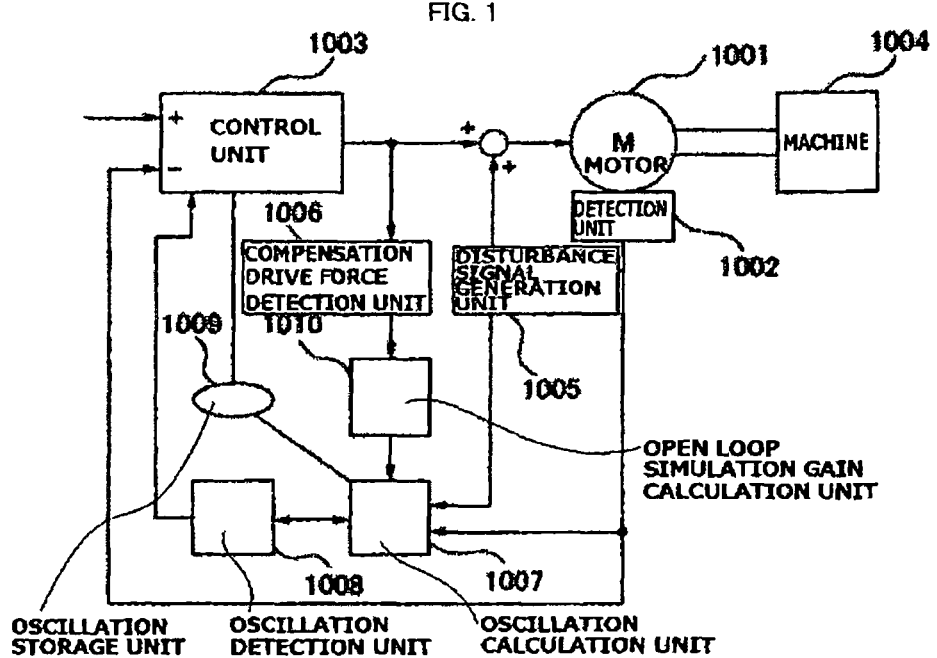
FIG. 1 is a block diagram showing the configuration of a conventional servo control device.
Figure 2:
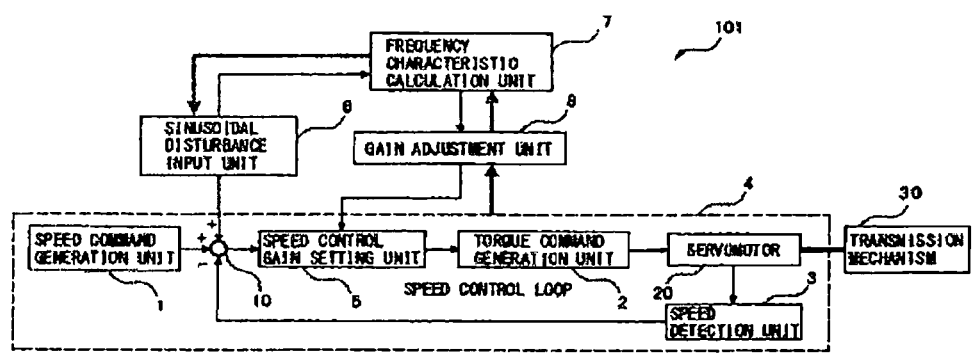
FIG. 2 is a block diagram showing the configuration of a servo control device according to an embodiment of the present invention.

A servo control device according to an embodiment of the present invention will be described below with reference to the drawings. FIG. 2 is a block diagram showing the configuration of the servo control device according to the embodiment of the present invention. A servo control device 101 according to the embodiment of the present invention is a servo control device for a machine tool having a feed axis driven by a servomotor 20. The servo control device 101 includes a speed command generation unit 1, a torque command generation unit 2, a speed detection unit 3, a speed control loop 4, a speed control gain setting unit 5, a sinusoidal disturbance input unit 6, a frequency characteristic calculation unit 7, and a gain adjustment unit 8. In the servo control device 101 of the embodiment of the present invention, when the speed control loop 4 has fallen into an oscillation state that is unstable due to an increase in speed control gain, the speed control gain is reduced and a sinusoidal sweep is temporarily stopped. After the speed control loop 4 is stabilized using the speed control gain which is lower than in the unstable state, the sinusoidal sweep is restarted. As a method for reducing the speed control gain, for example, the speed control gain may be changed to a minimum value within a specified gain allowance or phase allowance.

The speed command generation unit 1 generates a speed command value for the servomotor 20. The speed command value generated by the speed command generation unit 1 is outputted to an adder 10. The adder 10 adds a sinusoidal disturbance inputted from the sinusoidal disturbance input unit 6 to the speed command value, and subtracts a speed detection value detected by the speed detection unit 3 therefrom. The adder 10 outputs a calculation result to the speed control gain setting unit 5.

The torque command generation unit 2 generates a torque command value for the servomotor 20. To be more specific, the torque command generation unit 2 calculates the product of a calculation result of the adder 10 and a speed control gain, and outputs a torque command value to drive the servomotor 20. The servomotor 20 operates a driver (not shown) through a transmission mechanism 30.

The speed detection unit 3 detects the speed of the servomotor 20. The speed of the servomotor 20 is detected by using, for example, an encoder provided in the servomotor 20, but the invention is not limited thereto.

The speed control loop 4 includes the speed command generation unit 1, the torque command generation unit 2, and the speed detection unit 3. The speed control gain setting unit 5 sets a speed control gain adjusted by the gain adjustment unit 8, with respect to a calculation result, which is calculated by the adder 10, of subtracting a speed detection value of the servomotor 20 detected by the speed detection unit 3 from the sum of a sinusoidal disturbance inputted from the sinusoidal disturbance input unit 6 and a speed command value.

The sinusoidal disturbance input unit 6 performs a sinusoidal sweep on the speed control loop 4. More specifically, the sinusoidal disturbance input unit 6 inputs a sinusoidal disturbance to the adder 10.

The frequency characteristic calculation unit 7 estimates the gains and phases of speed control loop input and output signals from outputs of the speed control loop 4 when a sinusoidal wave is inputted to the speed control loop 4. The frequency characteristic calculation unit 7 expresses an output of the speed control loop 4 as the Fourier series having an arbitrary number of terms using a disturbance input frequency from the sinusoidal disturbance input unit 6 as a fundamental frequency, and calculates the amplitude and phase of a fundamental component of the Fourier series in order to calculate frequency characteristics online. The gain adjustment unit 8 preferably determines the adjustment amount of a speed control gain based on the difference between a desired target evaluation function value and an evaluation function value by an actual sweep.

When the speed control loop 4 has fallen into an oscillation state and has become unstable owing to an increased speed control gain, the servo control device 101 reduces the speed control gain and temporarily stops a sinusoidal sweep. After that, the servo control device 101 stabilizes the speed control loop 4 using the speed control gain which is lower than in the unstable state, and then restarts the sinusoidal sweep. As described above, when the control system has become unstable during online automatic adjustment, the servo control device according to the embodiment of the present invention temporarily and significantly reduces a control gain in order to stabilize the control system. Therefore, it is possible in principle to perform an adjustment sequence until completion. Moreover, when a large oscillation has occurred, the servo control device immediately and temporarily stops a sequence and restarts the sequence, thus allowing safe and easy automatic adjustment even when an operator is unaware of the instability.

Figure 3:
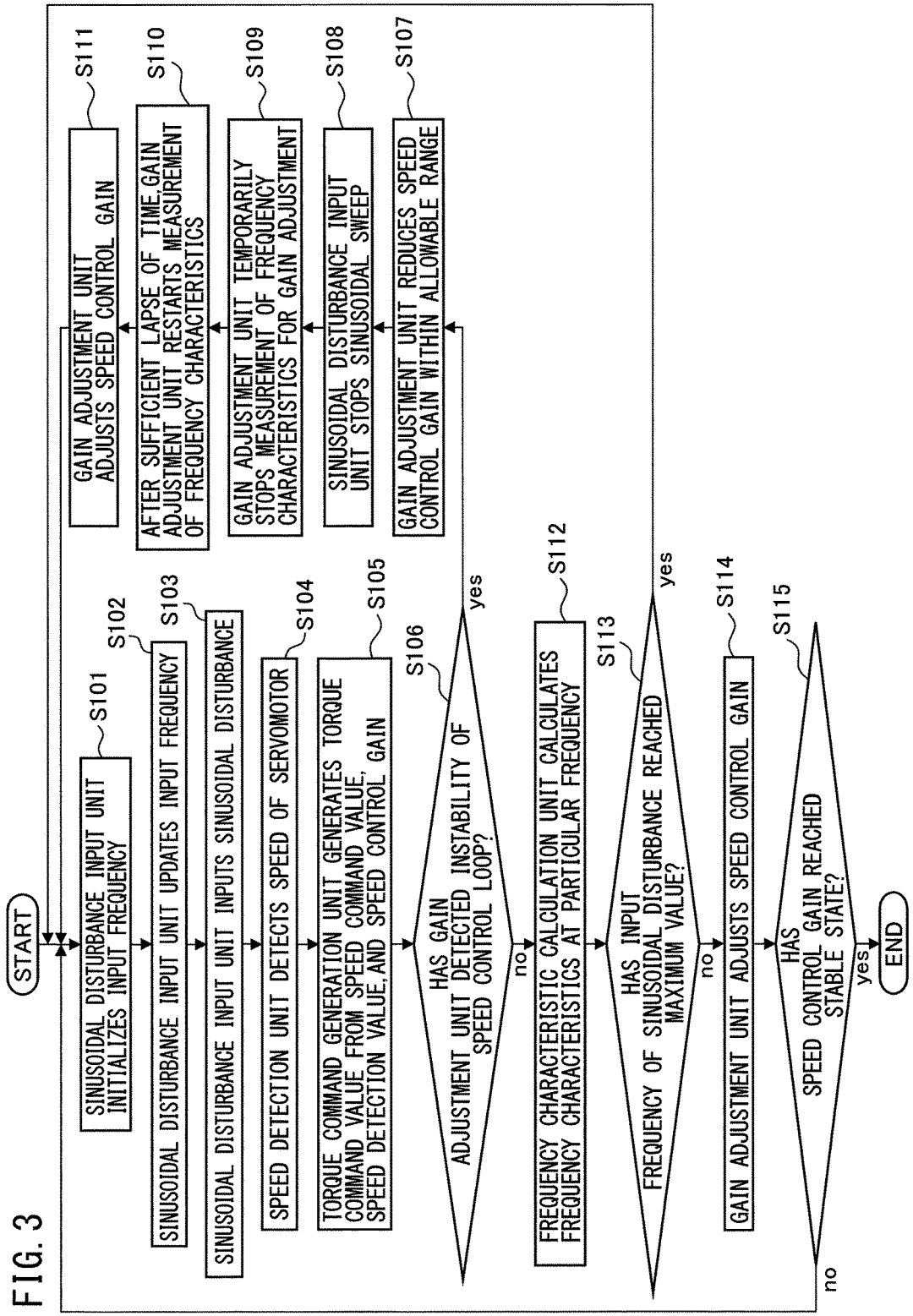
FIG. 3 is a flowchart of the operation of the servo control device according to the embodiment of the present invention.

Next, the operation of the servo control device according to the embodiment of the present invention will be described with reference to a flowchart of FIG. 3. In step S101, the sinusoidal disturbance input unit 6 initializes an input frequency. In step S102, the sinusoidal disturbance input unit 6 updates the input frequency. In step S103, the sinusoidal disturbance input unit 6 inputs a sinusoidal disturbance to the speed control loop 4.

Next, in step S104, the speed detection unit 3 detects the speed of the servomotor 20. In step S105, the torque command generation unit 2 generates a torque command value from a speed command value, a speed detection value, and a speed control gain.

Next, in step S106, whether or not the gain adjustment unit 8 has detected the instability of the speed control loop 4 is determined. More specifically, when the speed control loop 4 has fallen into an oscillation state owing to the increased speed control gain, the gain adjustment unit 8 determines that the speed control loop 4 has become unstable.

When the gain adjustment unit 8 determines the instability of the speed control loop 4 in step S106, the gain adjustment unit 8 reduces the speed control gain within an allowable range in step S107. As a method for reducing the speed control gain within the allowable range, for example, the speed control gain may be changed to an allowable minimum value.

Next, in step S108, the sinusoidal disturbance input unit 6 stops a sinusoidal sweep. In other words, the sinusoidal disturbance input unit 6 stops inputting the sinusoidal disturbance to the speed control loop 4. In step S109, the gain adjustment unit 8 temporarily stops measurement of frequency characteristics for gain adjustment.

In step S110, after a sufficient lapse of time, the gain adjustment unit 8 restarts the measurement of the frequency characteristics. Next, in step S111, the gain adjustment unit 8 adjusts the speed control gain. In other words, after the speed control loop 4 is stabilized using the lower speed control gain than in the unstable state, the sinusoidal sweep is restarted. After that, the operation returns to step S101, and steps S101 to S106 are performed again.

On the other hand, when the gain adjustment unit 8 does not detect the instability of the speed control loop 4 in step S106, the frequency characteristic calculation unit 7 calculates the frequency characteristics at the particular frequency in step S112.

Next, in step S113, the sinusoidal disturbance input unit 6 determines whether or not the input frequency of the sinusoidal disturbance has reached a maximum value.

When the sinusoidal disturbance input unit 6 determines that the input frequency of the sinusoidal disturbance has reached the maximum value in step S113, the operation returns to step S101, and steps S101 to S113 are performed again.

On the other hand, when the sinusoidal disturbance input unit 6 does not determine that the input frequency of the sinusoidal disturbance has reached the maximum value in step S113, the gain adjustment unit 8 adjusts the speed control gain in step S114.

Next, in step S115, the gain adjustment unit 8 determines whether or not the speed control gain has reached a stable state.

When the gain adjustment unit 8 determines that the speed control gain has reached a stable state in step S115, the sequential operation is ended. On the other hand, when the gain adjustment unit 8 does not determine that the speed control gain has reached a stable state in step S115, the operation returns to step S101, and steps S101 to S115 are performed again.

As described above, when the speed control loop 4 has become unstable, the servo control device 101 changes the speed control gain and performs the sinusoidal sweep in a repeated manner until the speed control loop 4 is stabilized, and restarts the measurement of the frequency characteristics of the speed control loop 4 after the stabilization of the speed control loop 4.

According to the servo control device of the embodiment of the present invention, as described above, when the control system has become unstable during the online automatic adjustment, the control gain is temporarily and significantly reduced in order to stabilize the control system.

According to the servo control device of the embodiment of the present invention, when the control system has become unstable, it is possible to perform the adjustment sequence for the online automatic adjustment of the control system until completion, while automatically stabilizing the control system.

What is claimed is:

1. A servo control device for a transmission mechanism driven by a servomotor, comprising:
    a speed control loop electrical circuitry in communication with the transmission mechanism, the speed control loop electrical circuitry configured to:
        generate a speed command value for the servomotor;
        set a speed control gain;
        generate a torque command value for the servomotor; and
        detect the speed of the servomotor,
    wherein the speed control loop electrical circuitry receives inputs from a sinusoidal disturbance input unit and a gain adjustment unit, and
    wherein the sinusoidal disturbance input unit generates a sinusoidal wave and performs a sinusoidal sweep on the speed control loop electrical circuitry; and
    a frequency characteristic calculation unit that receives an input from the sinusoidal disturbance input unit and estimates gain of speed control loop electrical circuitry when a sinusoidal wave is inputted to the speed control loop electrical circuitry,
    the frequency characteristic calculation unit expresses an output of the speed control loop as a Fourier series using a disturbance input frequency from the sinusoidal disturbance input unit as a fundamental frequency,
    wherein the frequency characteristic calculation unit calculates the amplitude and phase of a fundamental component of the Fourier series in order to calculate frequency characteristics online,
    wherein the gain adjustment unit determines the adjustment amount of a speed control gain based on the difference between a desired target evaluation function value and an evaluation function value by an actual sweep and outputs a signal to the speed control loop electrical circuitry to adjust the speed control gain online, and
    wherein when the speed control loop electrical circuitry has fallen into an oscillation state and has become unstable owing to an increased speed control gain determined during a sinusoidal sweep by the sinusoidal disturbance input unit, the speed control gain is reduced by the gain adjustment unit and the sinusoidal sweep is temporarily stopped.

2. The servo control device according to claim 1, wherein when the speed control loop electrical circuitry has become unstable, the speed control gain is changed by the gain adjustment unit and the sinusoidal sweep is performed in a repeated manner until the speed control loop electrical circuitry is stabilized, and after the stabilization of the speed control loop electrical circuitry, the gain adjustment unit measures frequency characteristics of the speed control loop electrical circuitry.

* * * * *